United States Patent Office 3,086,004
Patented Apr. 16, 1963

3,086,004
COMPLEX METAL COMPOUNDS OF WATER-INSOLUBLE AZO-DYESTUFFS
Richard Gross, Frankfurt am Main, and Hasso Hertel, Reinhard Mohr, and Walter Staab, all of Offenbach am Main, Germany, assignors to Farbwerke Hoechst Aktiengesellschaft vormals Meister Lucius & Brüning, Frankfurt am Main, Germany, a corporation of Germany
No Drawing. Filed Dec. 13, 1960, Ser. No. 75,482
Claims priority, application Germany Dec. 18, 1959
6 Claims. (Cl. 260—151)

The present invention relates to new complex metal compounds of water-insoluble azo-dyestuffs and to a process for their manufacture; more particularly it relates to complex metal compounds of water-insoluble azo-dyestuffs corresponding to the following general formula

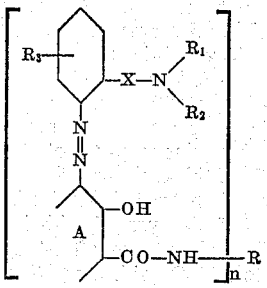

wherein $R_1$, $R_2$ represent alkyl, aryl, aralkyl or cycloalkyl groups or $R_1$ and $R_2$ represent together with the nitrogen atom a heterocyclic radical, $R_3$ represents a hydrogen atom, a halogen atom, an alkyl, alkoxy or nitro group or the group

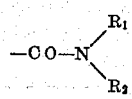

X the carbonyl or sulfonyl group, A a naphthalene, anthracene, diphenylene oxide, carbazole or benzocarbazole radical, R a radical of the benzene, naphthalene, diphenyl or diphenylene oxide series and $n$ represents the integer 1 or 2.

We have found that new complex metal compounds of water-insoluble azo-dyestuffs are obtained by coupling in substance, on the fiber or on another substratum the diazonium compounds of amines corresponding to the following general formula

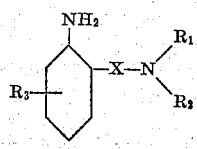

wherein $R_1$, $R_2$ represent an alkyl, aryl, aralkyl, or cycloalkyl group, or $R_1$ and $R_2$ represent together with the nitrogen atom a heterocyclic radical, $R_3$ a hydrogen atom, a halogen atom, an alkyl, alkoxy, or nitro group or the group

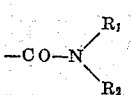

and X stands for the carbonyl or sulfonyl group, with arylides of aromatic or heterocyclic ortho-hydroxycarboxylic acids, the components being selected so that they are free from groups imparting solubility in water, such, for example, as sulfonic acid or carboxylic acid groups, and treating the dyestuffs so obtained with agents yielding metal.

The treatment of the water-insoluble azo-dyestuffs obtainable according to the process of this invention with the agents yielding metal may be carried out by known methods during or after the coupling in substance or on the fiber. When the dyestuffs are produced on the fiber, the metallization may be carried out by adding the agents yielding metal to the developing bath or to the impregnation bath. The treatment of the dyestuffs with agents yielding metal after the coupling may be carried out in a second bath which is neutral, weakly alkaline or weakly acid and may contain dispersing agents or detergents, for example, a fatty alcohol polyglycol ether, an alkylphenol polyglycol ether, an alkylnaphthol polyglycol ether, a fatty acid polyglycol ester or a fatty acid amide polyglycol ether.

As agents yielding metal, there are preferably used for the process of the present invention compounds yielding copper, cobalt, nickel, iron or manganese which may be used in the form of their inorganic or organic salts such, for example, as chlorides, bromides, sulfates, nitrates, formates or acetates or as complex compounds of these metals, especially with hydroxyalkylamines, such, for example, as diethanolamine, triethanolamine or N-methylethanolamine, or with aminocarboxylic acids, such, for example, as aminoacetic acid or nitrilotriacetic acid, or with aliphatic hydroxycarboxylic acids, such as citric acid, tartaric acid, gluconic acid or glycolic acid, or with alkali phosphates, such as alkali pyrophosphates or alkali polyphosphates.

On vegetable fibers, including fibers of regenerated cellulose, there are obtained by the ice colour method known for dyeing and printing, dyestuffs which possess, in addition to good general properties of fastness a very good fastness to ironing and light.

The brown tints which are obtained by using arylides of 2,3-hydroxynaphthoic acid as coupling components and nickel or copper compounds as agents yielding metal are particularly valuable.

The production of the dyestuffs on vegetable fibers may be carried out at a long goods-to-liquor ratio. Piece goods, warps or bands may be dyed in a continuous manner, or printed by the base or naphtholate printing process.

The new dyestuffs can also be produced on animal fibers such as wool or silk, or on synthetic fibers such as polyamide, acetylcellulose, or polyvinyl alcohol fibers by the usual dyeing processes for such fibers, and valuable dyeings possessing good properties of fastness are obtained.

The dyestuffs can also be prepared in substance and converted into complex metal compounds by treatment with agents yielding metal. The metallization can be carried out in an aqueous suspension or in an organic solvent such, for example, as acetone or dimethylformamide. The complex metal compounds so obtained are suitable for dyeing animal and synthetic fibers or for colouring organic plastic masses of high molecular weight.

As coupling components there can be used for the process of the present invention arylides of aromatic or heterocyclic ortho-hydroxycarboxylic acids such, for example, as arylides of 2,3-hydroxynaphthoic acid or its derivatives substituted in 6-position, or arylides of 2-hydroxyanthracene-3-carboxylic acid, 3-hydroxydiphenylene oxide-2-carboxylic acid, 2-hydroxycarbazole-3-carboxylic acid or 5-hydroxy-1,2,1',2'-benzocarbazole-4-carboxylic acid.

As diazo components for the process of the present invention, there can be used for example
1-aminobenzene-2-carboxylic acid-dialkylamides,
1-aminobenzene-2-carboxylic acid-alkylaralkylamides,
1-aminobenzene-2-carboxylic acid-alkyl-arylamides,
1-aminobenzene-2-carboxylic acid-alkyl-cycloalkylamides,
1-aminobenzene-2-carboxylic acid-diarylamides, 1-aminobenzene-2-carboxylic acid-dicycloalkylamides,
1-aminobenzene-2-carboxylic acid-diaralkylamides,
1-aminobenzene-2-carboxylic acid-aryl-cycloalkylamides,
1-aminobenzene-2-carboxylic acid - aralkyl-cycloalkylamides,
1-aminobenzene-2-carboxylic acid-aryl-aralkylamides,
1-aminobenzene-2-sulfonic acid-dialkylamides,
1-aminobenzene-2-sulfonic acid-alkyl-aralkylamides,
1-aminobenzene-2-sulfonic acid-alkylarylamides,
1-aminobenzene-2-sulfonic acid-alkyl-cycloalkylamides,
1-aminobenzene-2-sulfonic acid-dicycloalkylamides,
1-aminobenzene-diaralkylamides,
1-aminobenzene-2-sulfonic acid-aryl-cycloalkylamides,
1-aminobenzene-2-sulfonic acid-aralkyl-cycloalkylamides,
1-aminobenzene-sulfonic acid-arylaralkylamides and
1-aminobenzene-2-carboxylic acid-amides or 1-aminobenzene-2-sulfonic acid-amides in which $R_1$ and $R_2$ are members of a heterocyclic ring and the benzene nucleus may be substituted by, for example, halogen atoms, alkyl, alkoxy or nitro groups or by the group

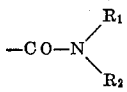

in which $R_1$ and $R_2$ have the meanings indicated above.

These compounds can be prepared by known methods, for example, by condensation of ortho-nitrobenzoic acid or ortho-nitrobenzenesulfonic acids with secondary amines and subsequent reduction of the nitro group with, for example, iron in weakly acid solution or in the catalytic way with nickel being used as a catalyst.

In most cases the compounds are obtained in sufficiently pure form after reduction thus not requiring a purification prior to their use as diazo component.

The following examples serve to illustrate the invention but they are not intended to limit it thereto; the parts being by weight unless otherwise stated and the relationship of parts by weight to parts by volume being the same as that of the kilogram to the liter.

EXAMPLE 1

Cotton yarn was treated for 45 minutes at 35° C., at a goods-to-liquor ratio of 1:20, in the impregnation bath prepared as described below, centrifuged and then developed first for 10 minutes at 20° C. and then, after being slowly heated to 90° C. to 95° C., for 20 to 30 minutes at 90° C. to 95° C. in a developing bath prepared as described below. The yarn was then rinsed with a solution containing, per liter of water, 3 cc. of hydrochloric acid of 20° Bé., soaped first for 15 minutes at 60° C. and then for 15 minutes at 95° C. with a solution containing, per liter of water, 1 gram of a reaction product from about 10 mols of ethylene oxide and 1 mol of isododecylphenol, and 3 grams of calcined sodium carbonate, rinsed and dried.

*Impregnation Bath*

1.75 grams of 2-(2',3'-hydroxynaphthoylamino)-naphthalene were dissolved in 3.5 cc. of denatured ethyl alcohol, 0.9 cc. of sodium hydroxide solution of 38° Bé., 1.8 cc. of hot water and 0.9 cc. of formaldehyde of 33% strength. The solution so obtained was made up to 1 liter with water of 35° C., 3 grams of a condensation product from fatty acids of high molecular weight and protein degradation products and 10 cc. of sodium hydroxide solution of 38° Bé.

*Developing Bath*

1.35 grams of 1-aminobenzene-2-carboxylic acid-N-methyl-N-(2'-methyl)-phenylamide were diazotized with 4 cc. of hydrochloric acid of 20° Bé. and 4 cc. of a sodium nitrite solution (1:5), and the diazo solution so prepared was given into a bath containing, per liter of water, 2 grams of a reaction product from about 20 mols of ethylene oide and 1 mol of octadecyl alcohol, 3 cc. of acetic acid of 50% strength, 10 grams of sodium acetate and 2.9 grams of $NiSO_4 \cdot 7H_2O$.

A red brown dyeing having good properties of fastness was obtained.

EXAMPLE 2

Cotton fabric was padded on the foulard with the following solution and dried:

12.8 grams of 2,3-hydroxynaphthoylaminobenzene were made into a paste with 20 grams of a wetting agent of the type of the oil sulfonates and 17 cc. of sodium hydroxide solution of 38° Bé., and made up to 1 liter with boiling water. The dried fabric was developed on the foulard with a solution containing, per liter of water, 12 grams of 1-aminobenzene-2-carboxylic acid-N-methyl-N-(2'-methyl)-phenylamide, diazotized with 20 cc. of hydrochloric acid of 20° Bé. and 20 cc. of a sodium nitrite solution (1:5), 2 grams of a reaction product from about 20 mols of ethylene oxide and 1 mol of octadecyl alcohol, and 20 grams of sodium acetate.

After passing through air for 30 seconds and hot water, the dyeing was after-treated for 5 minutes at 60° C. with a solution containing 5 grams of soap per liter of water, and dried. The dried fabric was printed with a printing paste containing, per kilogram, 200 grams of sodium formaldehydesulfoxylate, 25 grams of the sodium salt of benzylsulfanilic acid, 50 grams of potassium carbonate, 30 grams of anthraquinone paste of 30% strength and starch tragacanth as thickening agent.

The fabric was then treated for 7 minutes with steam at 102° C. to 103° C., washed with hot dilute sodium carbonate solution, rinsed and after-treated for 15 minutes at 90° C. to 95° C. with a solution containing, per liter of water, 1 gram of a reaction product from about 10 mols of ethylene oxide and 1 mol of isododecylphenol, 1 gram of sodium carbonate, 3 grams of aminoacetic acid and 2.8 grams of $NiSO_4 \cdot 7H_2O$.

The material was then rinsed and dried.

A white discharge on red brown ground was obtained. By using vat dyestuffs in the printing paste, there can be prepared color effects on red brown ground.

EXAMPLE 3

Wool yarn was treated for 45 minutes at 55° C. at a goods-to-liquor ratio in the impregnation bath prepared as described below and then rinsed for 5 minutes at 18° C. to 20° C. with a solution containing, per liter of water, 40 grams of sodium chloride and 3 grams of sodium carbonate. The excess liquor was then allowed to drain off the material, and the latter treated first for 20 to 30 minutes at 18° C. and then, after gradually heating the bath to 90° C. to 95° C. for 15 to 30 minutes at 90° C. to 95° C. in the developing bath described below. The yarn was then soaped for 20 minutes at 40° C. with a solution, containing, per liter of water, 1 gram of a reaction product from about 20 mols of ethylene oxide and 1 mol of octadecyl alcohol and 1 cc. of ammonia of 25% strength, and then for 20 minutes at 85° C. with a solution containing, per liter of water, 1 gram of a condensation product obtained from an aminoalkylsulfonic acid and a fatty acid of high molcelular weight, and 0.5 cc. of acetic acid of 50% strength, rinsed and dried.

*Impregnation Bath*

1 gram of 1-(2',3'-hydroxynaphthoylamino)-2-methyl-4-chlorobenzene and 0.6 gram of sodium hydroxide were dissolved in 5 cc. of denatured ethyl alcohol, 4 cc. of water of 60° C., 0.5 cc. of a condensation product obtained from fatty acids of high molecular weight and protein degradation products, and 1.2 cc. of a formaldehyde solution of 33% strength. The solution so obtained was made up to 1 liter with water of 60° C., 2.5 grams of a condensation product obtained from fatty acids of high molecular weight and protein degradation products, and 3 grams of sodium carbonate.

Developing Bath 0.85 gram of 1-aminobenzene-2-carboxylic acid-N-methyl-N-(2'-methyl)-phenylamide were diazotized with 2 cc. of hydrochloric acid of 20° Bé. and 2 cc. of a sodium nitrite solution (1:5). The diazo solution so obtained was poured into a bath containing 2 grams of a reaction product from about 20 mols of ethylene oxide and 1 mol of octadecyl alcohol, 2 cc. of acetic acid of 50% strength, 10 grams of sodium acetate and 1.8 grams of $CuSO_4 \cdot 5H_2O$.

A yellowish brown dyeing having good properties of fastness was obtained.

By using in the above example 1.6 grams of $CoCl_2 \cdot 6H_2O$ instead of 1.8 grams of copper sulfate·5H₂O, a brownish claret dyeing was obtained; by using 2.1 grams of $NiSO_4 \cdot 7H_2O$ a red brown dyeing having the same good properties of fastness was obtained.

EXAMPLE 4

Polyamide yarn was treated for 1 hour at 80° C. at a goods-to-liquor ratio of 1:20 in a solution containing, per liter of water, 1 gram of 1-(2',3'-hydroxynaphthoylamino)-2-methoxybenzene, 0.5 cc. of sodium hydroxide solution of 38° Bé., 10 cc. of denatured ethyl alcohol, 2 grams of a wetting agent of the type of the oil sulfonates and 0.5 gram of 1-aminobenzene-2-carboxylic acid-N-phenyl-N-benzylamide.

The yarn was then rinsed and treated for 30 minutes at 20° C. in a solution containing, per liter of water, 2 grams of sodium nitrite and 3 cc. of hydrochloric acid of 20° Bé., then treated for 10 minutes at 60° C. in a solution containing, per liter of water, 0.5 cc. of concentrated ammonia and 4 grams of sodium acetate. The material was then rinsed and treated for 30 minutes at 90° C. to 95° C. in a solution containing, per liter of water, 2.5 grams of $CuSO_4 \cdot 5H_2O$. The yarn is then rinsed, soaped for 15 minutes at 90° C. with a solution containing, per liter of water, 1 gram of a reaction product from about 10 mols of ethylene oxide and 1 mol of isododecyl phenol, and 3 grams of sodium carbonate, rinsed and dried.

A yellowish brown dyeing having good properties of fastness was obtained.

By using in the above examples 2.4 grams of $CoCl_2 \cdot 6H_2O$ instead of 2.5 grams of $CuSO_4 \cdot 5H_2O$, a reddish brown dyeing was obtained; by using 2.8 grams of $NiSO_4 \cdot 7H_2O$ a rust-red dyeing having the same good properties of fastness was obtained.

EXAMPLE 5

Polyvinyl alcohol yarn was treated for 1 hour at 90° C. to 95° C. at a goods-to-liquor ratio of 1:30 in the following solution:

1 gram of 2,3-hydroxynaphthoylaminobenzene and 0.5 cc. of 1-aminobenzene-2-carboxylic acid-N-methyl-N-(2'-methyl)-phenylamide were dissolved in 5 cc. of denatured ethyl alcohol, 5 cc. of dimethylformamide, 0.5 cc. of sodium hydroxide solution of 38° Bé. and 2.5 cc. of hot water and the solution was introduced into a bath containing, per liter of water, 2 grams of a wetting agent of the type of the oil sulfonates and 5 cc. of sodium hydroxide solution of 38° Bé.

The material was then rinsed and treated for 30 minutes at 65° C. with a solution containing, per liter of water, 2 grams of sodium nitrite and 3 cc. of hydrochloric acid of 20° Bé. The excess liquor was then allowed to drain off the material and the latter treated for 15 minutes at 95° C. in a bath containing, per liter of water, 4 grams of sodium acetate, 2 grams of a reaction product from about 10 mols of ethylene oxide and 1 mol of iso- dodecylphenol and 2 grams of $CuSO_4 \cdot 5H_2O$. The yarn was then rinsed and dried.

A yellowish brown dyeing having good properties of fastness was obtained.

By using in the above example 2 grams of $CoCl_2 \cdot 6H_2O$, instead of 2 grams of $CuSO_4 \cdot 5H_2O$, a brownish scarlet dyeing was obtained; by using 2 grams of $NiSO_4 \cdot 7H_2O$, a red brown dyeing having the same good properties of fastness was obtained.

EXAMPLE 6

Natural silk was treated for 45 minutes at 25° C. at a goods-to-liquor ratio of 1:30 in the impregnation bath prepared as described below, centrifuged and then developed for 15 minutes at 20° C. and, after slowly heating the bath to 95° C., for 20 minutes at this temperature. The material was then rinsed, acidified with a solution containing, per liter of water, 3 grams of hydrochloric acid of 20° Bé., rinsed and soaped for 15 minutes at 95° C. with a solution containing 5 grams of soap per liter of water, rinsed again and dried.

Impregnation Bath 3 grams of 2,3-hydroxynaphthoylaminobenzene were dissolved in 6 cc. of denatured ethyl alcohol, 1.5 cc. of sodium hydroxide solution of 38° Bé., 3 cc. of hot water and 1.5 cc. of a formaldehyde solution of 33% strength. The solution so obtained was made up to 1 liter with water of 25° C., 5 grams of a condensation product obtained from fatty acids of high molecular weight and protein degradation products, 4 cc. of sodium hydroxide solution of 38° Bé. and 10 grams of sodium chloride.

Developing Bath 1.82 grams of 1-aminobenzene-2-carboxylic acid-N-phenyl-N-benzylamide were diazotized with 2.35 cc. of hydrochloric acid of 20° Bé. and 2.4 cc. of a sodium nitrite solution (1:5). The diazo solution was introduced into a bath containing 2 grams of a reaction product from about 20 mols of ethylene oxide and 1 mol of octadecyl alcohol, 3 cc. of acetic acid of 50% strength, 10 grams of sodium acetate and 2 grams of $NiSO_4 \cdot 7H_2O$ and the whole was made up to 1 liter with water.

A red brown dyeing having good properties of fastness was obtained.

By using in the above example 1.75 grams of $CuSO_4 \cdot 5H_2O$, instead of 2 grams of $NiSO_4 \cdot 7H_2O$, a rust-red dyeing was obtained; by using 1.65 grams of $CoCl_2 \cdot 6H_2O$, a brownish scarlet dyeing having the same good properties of fastness was obtained.

EXAMPLE 7

23 parts of 1-aminobenzene-2-carboxylic acid-N-methyl-N-phenylamide were diazotized at 30° C. in 400 parts by volume of water and 50 parts by volume of 5 N hydrochloric acid with 20.5 parts by volume of 5 N sodium-nitrite solution. The yellow diazo solution was clarified and then introduced at 40° C. into a suspension of 26.1 parts of 2,3-hydroxynaphthoylaminobenzene in 100 parts by volume of water, 10 parts by volume of glacial acetic acid, 68 parts of sodium acetate and 1 gram of a dispersing agent.

The coupling being complete, the whole was neutralized with sodium hydroxide solution and, after addition of 25 parts of crystallized copper sulfate and 60 parts of triethanolamine, heated to 80° C. to 90° C. while stirring.

After completion of the metallization, the complex copper compound formed was suction-filtered while hot, washed first with water until neutral and then after-washed with 100 parts by volume of methyl alcohol. After drying at 70° C. to 80° C., the complex copper compound was obtained in the form of a reddish brown powder which was difficultly soluble in alcohol but easily soluble in benzene.

By using for the metallization in the above example 28 parts of $NiSO_4 \cdot 7H_2O$ and 30 parts of aminoacetic acid, instead of 25 parts of copper sulfate and 60 parts of triethanolamine, the complex nickel compound of the dyestuff was obtained in the form of a red powder which was difficultly soluble in alcohol and easily soluble in benzene. In the same manner there was obtained from 28 parts of crystallized cobalt sulfate and 30 parts of aminoacetic acid the complex cobalt compound of the dyestuff in the form of a red brown powder which was difficultly soluble in alcohol and easily soluble in benzene.

In the following table further components are listed which can be used in the process of the invention, and the tints produced by forming the metalliferous azo-dyestuffs from these components on the fiber, which tints likewise possess good fastness properties.

| Diazo component | Coupling component | Tint | | |
|---|---|---|---|---|
| | | Copper complex | Cobalt complex | Nickel complex |
| 1-aminobenzene-2-carboxylic acid-N-ethyl-N-(2'-methyl)-phenylamide. | 2,3-hydroxynaphthoyl-aminobenzene | Rust | Rust | Rust brown. |
| Do | 1-(2',3'-hydroxynaphthoylamino)-3-nitrobenzene | do | Yellowish brown | Bluish red brown. |
| Do | 1-(2',3'-hydroxynaphthoylamino)-naphthalene | Yellowish brown | Rust | Rust red. |
| Do | 2-(2',3'-hydroxynaphthoylamino)-naphthalene | do | do | Red brown. |
| Do | 1-(2',3'-hydroxynaphthoylamino)-2-methoxy-4-chloro-5-methyl-benzene | Rust | do | Reddish brown. |
| Do | 1-(2',3'-hydroxynaphthoylamino)-2-methyl-benzene | Brownish yellow | Yellowish brown | Red brown. |
| Do | 1-(2',3'-hydroxynaphthoylainmo)-2-methyl-4-chloro-benzene | do | do | Reddish brown. |
| Do | 1-(2',3'-hydroxynaphthoylamino)-2-methyl-4-methoxybenzene | do | do | Do. |
| Do | 1-(2',3'-hydroxynaphthoylamino)-2-4-dimethoxy-5-chloro-benzene | Rust | Rust | Do. |
| Do | 1-(2',3'-hydroxynaphthoylamino)-2,5-dimethoxy-4-chlorobenzene | do | do | Do. |
| Do | 4,4'-bis-(2'',3''-hydroxynaphthoylamino)-3,3'-dimethoxydiphenyl | Red brown | Red brown | Red brown. |
| Do | 1-(2'-hydroxycarbazole-3'-carboylamino)-4-chlorobenzene | Bluish red brown | Yellowish brown | Yellowish brown. |
| Do | 1-(3'-hydroxydiphenylene oxide-2'-carboylamino)-2,5-dimethoxy-benzene | Red brown | do | Bluish red brown. |
| Do | 1-(2'-hydroxyantharcene-3'-carboylamino)-2-methylbenzene | Violet | Violet | Claret. |
| Do | 1-(2',3'-hydroxynaphthoylamino)-2-ethoxybenzene | Reddish brown | Yellowish brown | Red brown. |
| Do | 2-(2',3'-hydroxynaphthoylamino)-3-methoxydiphenylene oxide | Yellowish brown | Rust | Reddish brown. |
| Do | 1-(6'-bromo-2',3'-hydroxynaphthoylamino)-2-methoxy-benzene | do | do | Red brown. |
| Do | 1-(5'-hydroxy-1',2',1'',2''-benzocarbazole-4'-carboylamino)-4-methoxybenzene | Blackish currant | Blackish currant | Blackish currant. |
| Do | 1-(5'-hydroxy-1',2',1'',2''-benzocarbazole-4'-carboylamino)-2-methyl-4-methoxybenzene | do | do | Do. |
| Do | 1-(2',3'-hydroxynaphthoylamino)-2-methyl-5-chlorobenzene | Reddish brown | Rust | Reddish brown. |
| Do | 1-(2',3'-hydroxynaphthoylamino)-2,4-dimethylbenzene | do | do | Do. |
| Do | 1-(2',3'-hydroxynaphthoylamino)-2,3-dimethylbenzene | do | do | Do. |
| 1-aminobenzene-2-carboxylic acid-dicyclohexylamide. | 1-(2',3'-hydroxynaphthoylamino)-4-methoxybenzene | Yellowish brown | Yellowish brown | Do. |
| Do | 1-(2',3'-hydroxynaphthoylamino)-2-methoxybenzene | Rust | Reddish brown | Red brown. |
| Do | 1-(2',3'-hydroxynaphthoylamino)-4-chlorobenzene | Yellowish brown | Yellowish brown | Reddish brown. |
| Do | 1-(2,3'-hydroxynaphthoylamino)-2,5-dimethoxybenzene | do | Reddish brown | Red brown. |
| Do | 1-(2',3'-hydroxynaphthoylamino)-2-methoxy-5-chlorobenzene | do | do | Do. |
| Do | 1-(2',3'-hydroxynaphthoylamino)-4-methylbenzene | do | Yellowish brown | Reddish brown. |
| Do | 1-(2',3'-hydroxynaphthoylamino)-4-ethoxybenzene | do | do | Do. |
| Do | 1-(3'-hydroxydiphenylene oxide-2'-carboylamino)-naphthalene | Reddish brown | Red brown | Red brown. |
| Do | 1-(3'-hydroxydiphenylene oxide-2'-carboylamino)-2-ethoxybenzene | do | do | Do. |
| 1-aminobenzene-2-carboxylic acid-dimethylamide. | 4,4'-bis-(2'',3''-hydroxynaphthoylanimo)-3,3'-dimethoxy-diphenyl | Red brown | do | Do. |
| 1-aminobenzene-2-carboxylic acid-diethylamide. | 1-(2',3'-hydroxynaphthoylamino)-2,5-dimethoxybenzene | Yellowish brown | Yellowish brown | Reddish brown. |
| 1-aminobenzene-2 carboxylic acid di-n-butylamide. | 1-(2',3'-hydroxynaphthoylamino)-4-methoxybenzene | Reddish brown | do | Red brown. |
| 1-aminobenzene-2-carboxylic acid-N-ethyl-N-phenylamide. | 1-(2',3'-hydroxynaphthoylamino)-2-methylbenzene | Brownish yellow | do | Do. |
| 1-aminobenzene-2-carboxylic acid-N-methyl-N-(2'-methyl)-phenylamide. | 1-(2',3'-hydroxynaphthoylamino)-2,5-dimethoxybenzene | Reddish brown | do | Reddish brown. |
| 1-aminobenzene-2-carboxylic acid-N-ethyl-N-(4'-methyl)-phenylamide. | 1-(2',3'-hydroxynaphthoylamino)-2,4-dimethoxy-5-chlorobenzene | Yellowish brown | do | Red brown. |
| 1-aminobenzene-2-carboxylic acid-N-methyl-N-(4'-methyl)-phenylamide. | 2-(2',3'-hydroxynapththoylamino)-naphthalene | do | do | Do. |
| 1-aminobenzene-2-carboxylic acid-piperidide. | 1-(2',3'-hydroxynaphthoylamino)-2,5-dimethoxy-4-chlorobenzene | do | Reddish brown | Reddish brown. |
| 1-aminobenzene-2-carboxylic acid-N-methyl-N-(2'-chloro)-phenylamide. | 1-(2',3'-hydroxynaphhoylamino)-2-methoxy-4-chloro-5-methylbenzene | | Yellowish brown | Do. |
| 1-aminobenzene-2-carboxylic acid-dibenzylamide | 1-(3'-hydroxydiphenylene oxide-2'-carboylamino)-naphthalene | | do | Red brown. |

| Diazo component | Coupling component | Tint | |
|---|---|---|---|
| | | Manganese complex | Iron complex |
| 1-aminobenzene-2-carboxylic acid-morpholide | 1-(2',3'-hydroxy-naphthoylamino)-2,4-dimethoxy-5-chlorobenzene | Red brown | Red brown. |
| 1-aminobenzene-2-carboxylic acid-N-phenyl-N-benzylamide | 2,3-hydroxynaphthoylamino-benzene | Scarlet | |

| Diazo component | Coupling component | Tint | Complex |
|---|---|---|---|
| 1-aminobenzene-2-carboxylic acid-N-methyl-N-(2'-methyl)-phenylamide. | 1-(2',3'-hydroxynaphthoylamino)-naphthalene | Rust red | Nickel. |
| Do | do | do | Copper. |
| Do | 2,3-hydroxynaphthoylamino-benzene | Red brown | Do. |
| Do | 2-(2',3'-hydroxynaphthoylamino)-naphthalene | do | Do. |
| 1-aminobenzene-2,5-dicarboxylic acid-di-N-methyl-N-phenylamide. | 2,3-hydroxynaphthoylaminobenzene | do | Nickel. |
| Do | 1-(2',3'-hydroxynaphthoylamino)-2-methyl-4-chlorobenzene. | do | Do. |
| Do | 2-(2',3'-hydroxynaphthoylamino)-3-methoxy-diphenylene oxide. | Rust red | Do. |
| 1-aminobenzene-2,5-dicarboxylic acid-di-N-methyl-N-(2'-chloro)-phenylamide. | 1-(2',3'-hydroxynaphthoylamino)-3-nitrobenzene | Red brown | Do. |
| Do | 1-(2',3'-hydroxynaphthoylamino)-2-methoxy-4-chloro-5-methylbenzene. | Rust red | Do. |
| Do | 1-(2',3'-hydroxynaphthoylamino)-2,4-dimethoxy-5-chlorobenzene. | do | Do. |
| 1-amino-4-chlorobenzene-2-carboxylic acid-N-methyl-N-phenylamide. | 1-(2',3'-hydroxynaphthoylamino)-4-methoxybenzene | Red brown | Do. |
| Do | 1-(2',3'-hydroxynaphthoylamino)-4-chlorobenzene | Bluish red brown | Do. |
| Do | 1-(2',3'-hydroxynaphthoylamino)-2-methyl-4-methoxy-benzene. | Red brown | Do. |
| Do | 2-(2',3'-hydroxynaphthoylamino)-naphthalene | Bluish red brown | Do. |
| 1-aminobenzene-2,5-dicarboxylic acid-bis-diethyl-amide. | do | Red brown | Do. |
| 1-aminobenzene-2,5-dicarboxylic acid-dipiperidide | 1-(2',3'-hydroxynaphthoylamino)-4-chlorobenzene | do | Do. |
| Do | 1-(2',3'-hydroxynaphthoylamino)-2-methyl-5-chloro-benzene. | Reddish rust | Do. |
| Do | 1-(2',3'-hydroxynaphthoylamino)-2-methyl-4-chloro-benzene. | Red brown | Do. |
| 1-amino-4-chlorobenzene-2-carboxylic acid-di-n-butylamide. | 2,3-hydroxynaphthoylaminobenzene | do | Do. |
| Do | 2-(2',3'-hydroxynaphthoylamino)-naphthalene | do | Do. |
| Do | 1-(2',3'-hydroxynaphthoylamino)-2-methoxy-4-chloro-5-methylbenzene. | do | Do. |
| Do | 1-(2',3'-hydroxynaphthoylamino)-2,5-dimethoxy-benzene. | do | Do. |
| 1-amino-3-chlorobenzene-2-carboxylic acid-N-methyl-N-phenylamide. | 2-(2',3'-hydroxynaphthoylamino)-naphthalene | Rust red | Do. |
| Do | 1-(2',3'hydroxynaphthoylamino)-4-ethoxybenzene | do | Do. |
| 1-amino-4-chlorobenzene-2-carboxylic acid-di-ethylamide. | 2,3-hydroxynaphthoylaminobenzene | Brownish garnet | Do. |
| Do | 1-(2',3'-hydroxynaphthoylamino)-3-nitrobenzene | do | Do. |
| Do | 2-(2',3'-hydroxynaphthoylamino)-3-methoxy-diphenylene oxide. | Rust | Do. |
| Do | 1-(2',3'-hydroxynaphthoylamino)-2,3-dimethylbenzene | Red brown | Do. |
| 1-aminobenzene-2,5-dicarboxylic acid-di-N-ethyl-N-(4'-methyl)-phenylamide. | 2-(2',3'-hydroxynaphthoylamino)-naphthalene | do | Do. |
| Do | 1-(2',3'-hydroxynaphthoylamino)-naphthalene | Rust red | Do. |
| Do | 1-(2',3'-hydroxynaphthoylamino)-2,4-dimethoxy-5-chlorobenzene. | do | Do. |
| 1-aminobenzene-2-carboxylic acid-N-methyl-N-phenylamide. | 1-(2',3'-hydroxynaphthoylamino)-4-methoxybenzene | Red brown | Do. |
| Do | 1-(2',3'-hydroxynaphthoylamino)-2-methoxybenzene | Brown red | Do. |

EXAMPLE 8

Cotton yarn was treated for 45 minutes at 35° C. at a goods-to-liquor ratio of 1:20 in the impregnation bath prepared as described below, centrifuged and developed first, while wet, for some minutes at 20° C. and then, after slowly heating the bath to 95° C., for 20 to 30 minutes at 90° C. to 95° C. in the developing bath prepared as described below. The material was then rinsed with a solution containing 3 cc. of hydrochloric acid of 20° Bé. per liter of water, soaped first for 15 minutes at 60° C., then for 15 minutes at 95° C. with a solution containing, per liter of water, 1 gram of a reaction product from about 10 moles of ethylene oxide and 1 mol of isododecyl phenol, and 3 grams of sodium carbonate, rinsed and dried.

*Impregnation Bath*

3.5 grams of 1-(2',3'-hydroxynaphthoylamino)-naphthalene were dissolved in 5 cc. of denatured ethyl alcohol, 1.7 cc. of sodium hydroxide solution of 38° Bé., 5 cc. of hot water and 1.7 cc. of a formaldehyde solution of 30% strength.

The solution so obtained was made up to 1 liter with water of 95° C., 3 grams of a condensation product from fatty acids of high molecular weight and protein degradation products and 10 cc. of sodium hydroxide solution of 38° Bé.

*Developing Bath*

2 grams of 1-aminobenzene-2-sulfonic acid-dimethyl-amide were diazotized with 4 cc. of hydrochloric acid of 20° Bé. and 4 cc. of a sodium nitrite solution (1:5) and the diazo solution so prepared was introduced into a bath containing, per liter of water, 2 grams of a reaction product of about 20 mols of ethylene oxide and 1 mol of octadecyl alcohol, 1.5 cc. of acetic acid of 50% strength, 7 grams of sodium acetate and 1.8 grams of $CuSO_4 \cdot 5H_2O$.

A rust-red dyeing was obtained.

EXAMPLE 9

Cotton yarn was treated for 45 minutes at 35° C. at a goods-to-liquor ratio of 1:20 in the impregnation bath prepared as described below, centrifuged and, while wet, developed for 30 minutes at 20° C. in the developing bath prepared as described below. The material was then rinsed with a solution containing 3 cc. of hydrochloric acid of 20° Bé. per liter of water, soaped for 20 minutes at 95° C. with a solution containing, per liter of water, 1 gram of a reaction product from about 10 mols of ethylene oxide and 1 mol of isododecylphenol, 1 gram of sodium carbonate, 2.5 grams of $CuSO_4 \cdot 5H_2O$ and 7.5 grams of triethanolamine, rinsed and dried.

*Impregnation Bath*

1.4 grams of 2-(2',3'-hydroxynaphthoylamino)-3-methoxy-diphenylene oxide were dissolved in 2.8 grams of denatured ethyl alcohol, 0.7 cc. of sodium hydroxide solution of 38° Bé., and 2 cc. of hot water. The solution so obtained was made up to 1 liter with water of 35° C., 3 grams of a condensation product of fatty acids of high molecular weight and protein degradation products, and 10 cc. of sodium hydroxide solution of 38° Bé.

*Developing Bath*

2 grams of 1-aminobenzene-2-sulfonic acid-dimethyl-amide in the form of a diazonium compound prepared in the usual manner were dissolved in 1 liter of water containing 2 grams of a reaction product from about 20 mols of ethylene oxide and 1 mol of octadecyl alcohol, 3 cc. of acetic acid of 50% strength and 10 grams of sodium acetate. A red brown dyeing was obtained.

EXAMPLE 10

10 parts of 1-aminobenzene-2-sulfonic acid-dimethylamide were stirred with 50 parts by volume of water and 40 parts by volume of hydrochloric acid ($d=1.16$). After the addition of ice, the whole was diazotized with 10 parts by volume of 1 5 N sodium-nitrite solution. The diazo solution so obtained was combined at 50° C. with a suspension of 2,3-hydroxynaphthoylaminobenzene prepared as follows:

13.15 parts of 2,3-hydroxynaphthoylaminobenzene were dissolved in 20 parts by volume of denatured alcohol and 30 parts by volume of sodium hydroxide solution ($d=1.19$), diluted with 100 parts by volume of water and the solution so obtained was introduced into a mixture of 1000 parts by volume of water, 20 parts by volume of acetic acid and 1 part of a reaction product from about 20 mols of ethylene oxide and 1 mol of oleyl alcohol. To this mixture, there was added a solution of 81.6 parts of sodium acetate in 300 parts by volume of water.

The coupling being complete, the whole was neutralized with a sodium hydroxide solution, and a solution of 12.5 parts of copper sulfate and 30 parts of triethanolamine in 200 parts by volume of water was added thereto. The whole was then heated to 95° C. and treated for 2 hours at this temperature. The dyestuff formed was removed by suction-filtration, washed and dried. It was a brown powder.

lected from the group consisting of copper and nickel, of a water-insoluble azo-dyestuff having the formula

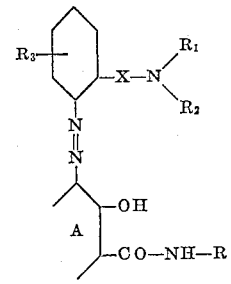

wherein $R_1$, $R_2$ represent individual members selected from the group consisting of lower alkyl, benzyl, phenyl, methylphenyl, chlorophenyl, cyclohexyl, and together with the nitrogen atom the radical of the group consisting of piperidine and morpholine, $R_3$ stands for a member of the group consisting of hydrogen, chlorine, lower alkyl, lower alkoxy and the group

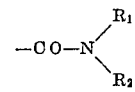

$R_1$ and $R_2$ having the same meanings as indicated above, X stands for a member selected from the group consisting of carbonyl and sulfonyl, A stands for a member of the group consisting of naphthalene, anthracene, carbazole, benzocarbazole and diphenylene oxide, R represents a

| Diazo component | Coupling component | Tint | Complex |
|---|---|---|---|
| 1-aminobenzene-2-sulfonic acid-dimethylamide | 1-(2',3'-hydroxynaphthoylamino)-2-methoxybenzene | Rust | Copper. |
| 1-aminobenzene-2-sulfonic acid-N-methyl-N-phenylamide. | 1-(2',3'-hydroxynaphthoylamino)-2,4-dimethoxy-5-chlorobenzene. | do | Do. |
| 1-aminobenzene-2-sulfonic acid-dimethylamide | do | Rust red | Do. |
| 1-aminobenzene-2-sulfonic acid-diethylamide | 1-(2',3'-hydroxynaphthoylamino)-2-methyl-4-chlorobenzene | Rust | Do. |
| Do | 1-(2',3'-hydroxynaphthoylamino)-2-methyl-4-methoxybenzene | do | Do. |
| 1-aminobenzene-2-sulfonic acid-N-methyl-N-phenylamide. | 1-(2',3'-hydroxynaphthoylamino)-2-methoxy-4-chloro-5-methylbenzene. | Reddish rust | Do. |
| Do | 1-(2',3'-hydroxynaphthoylamino)-2,5-dimethoxybenzene | do | Do. |
| Do | 1-(2',3'-hydroxynaphthoylamino)-2-methoxy-5-chlorobenzene | do | Do. |
| 1-amino-5-chlorobenzene-2-sulfonic acid-dimethylamide. | 1-(2',3'-hydroxynaphthoylamino)-naphthalene | Red brown | Do. |
| Do | 2-(2',3'-hydroxynaphthoylamino)-3-methoxy-diphenylene oxide. | do | Do. |
| Do | 1-(2',3'-hydroxynaphthoylamino)-2-methoxybenzene | Rust red | Do. |
| 1-amino-4,5-dimethoxybenzene-2-sulfonic acid-dimethylamide. | 1-(2',3'-hydroxynaphthoylamino)-2-ethoxybenzene | Brownish garnet | Do. |
| Do | 1-(2',3'-hydroxynaphthoylamino)-naphthalene | Rust red | Do. |
| Do | 1,(2',3'-hydroxynaphthoylamino)-2-methyl-5-chlorobenzene | Garnet | Do. |
| Do | 1-(2',3'-hydroxynaphthoylamino)-2,4-dimethoxy-5-chlorobenzene. | Rust red | Do. |
| 1-amino-5-methylbenzene-2-sulfonic acid-dimethylamide. | 2,3-hydroxynaphthoylaminobenzene | Rust | Do. |
| Do | 1-(2',3'-hydroxynaphthoylamino)-naphthalene | Brownish garnet | Do. |
| Do | 2-(2',3'-hydroxynaphthoylamino)-naphthalene | Rust | Do. |
| Do | 1-(2',3'-hydroxynaphthoylamino)-2,4-dimethoxy-4-chlorobenzene. | do | Do. |
| Do | 1-(2',3'-hydroxynaphthoylamino)-2-methyl-4-chlorobenzene | Red brown | Do. |
| Do | 1-(2',3'-hydroxynaphthoylamino)-2-methoxybenzene | Rust red | Do. |
| 1-amino-4,5-dimethoxybenzene-2-sulfonic acid-diethylamide. | 1-(2',3'-hydroxynaphthoylamino)-naphthalene | Red brown | Do. |
| Do | 1-(2',3'-hydroxynaphthoylamino)-2-methoxybenzene | do | Do. |
| Do | 1-(2',3'-hydroxynaphthoylamino)-2-methylbenzene | do | Do. |
| Do | 1-(2',3'-hydroxynaphthoylamino)-2-methyl-4-chlorobenzene | Brownish garnet | Do. |
| 1-aminobenzene-2-sulfonic acid-piperidide | 1-(2',3'-hydroxynaphthoylamino)-2,4-dimethoxy-5-chlorobenzene. | Reddish rust | Do. |
| Do | 1-(2',3'-hydroxynaphthoylamino)-2,5-dimethoxy-4-chlorobenzene. | do | Do. |
| 1-amino-5-chlorobenzene-2-sulfonic acid-morpholide. | 1-(2',3'-hydroxynaphthoylamino)-2,4-dimethoxy-5-chlorobenzene. | Red brown | Do. |
| Do | 2-(2',3'-hydroxynaphthoylamino)-3-methoxy-diphenylene oxide. | do | Do. |
| 1-aminobenzene-2-sulfonic acid-morpholide | 1-(2',3'-hydroxynaphthoylamino)-2-methylbenzene | do | Do. |
| Do | 1-(2',3'-hydroxynaphthoylamino)-naphthalene | do | Do. |
| Do | 1-(2',3'-hydroxynaphthoylamino)-2,4-dimethylbenzene | Reddish rust | Do. |
| 1-amino-5-chlorobenzene-2-sulfonic acid-N-methyl-N-phenylamide. | 1-(2',3'-hydroxynaphthoylamino)-2,4-dimethoxy-5-chlorobenzene. | do | Do. |
| 1-aminobenzene-2-sulfonic acid-N-phenyl-N-benzylamide. | do | Rust | Do. |
| Do | 1-(2',3'-hydroxynaphthoylamino)-2,5-dimethoxybenzene | do | Do. |

We claim:
1. A complex metal compound containing a metal selected from the group consisting of the benzene, diphenyl, naphthalene and diphenylene oxide series.

2. The nickel complex compound of the water-insoluble azo-dyestuff having the formula:

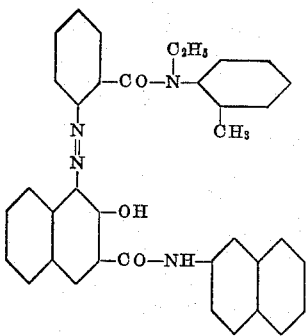

3. The nickel complex compound of the water-insoluble azo-dyestuff having the formula:

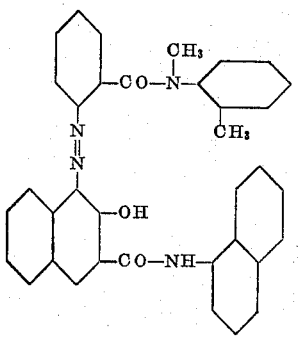

4. The nickel complex compound of the water-insoluble azo-dyestuff having the formula:

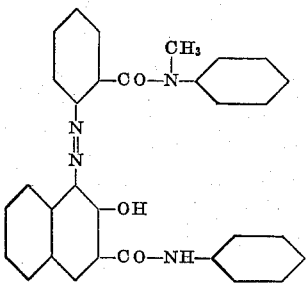

5. The copper complex compound of the water-insoluble azo-dyestuff having the formula:

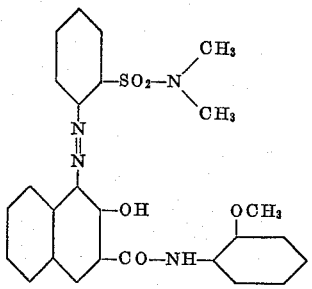

6. The copper complex compound of the water-insoluble azo-dyestuff having the formula:

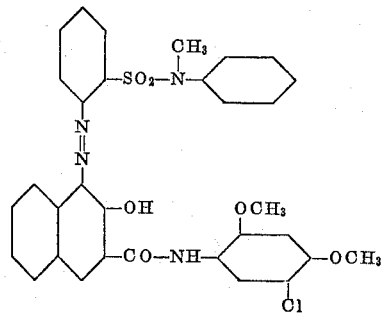

References Cited in the file of this patent
UNITED STATES PATENTS

| | | |
|---|---|---|
| 2,004,383 | Schimmelschmidt et al. | June 11, 1935 |
| 2,209,749 | Schrader et al. | July 30, 1940 |
| 2,210,072 | Fischer | Aug. 6, 1940 |
| 2,270,678 | Fischer | Jan. 20, 1942 |
| 2,416,248 | Woodward | Feb. 18, 1947 |
| 2,839,521 | Schetty | June 17, 1958 |